(12) United States Patent
Honda et al.

(10) Patent No.: US 11,548,510 B2
(45) Date of Patent: Jan. 10, 2023

(54) VEHICLE CONTROL APPARATUS, VEHICLE, VEHICLE CONTROL METHOD, AND STORAGE MEDIUM

(71) Applicant: HONDA MOTOR CO., LTD., Tokyo (JP)

(72) Inventors: Shigehiro Honda, Wako (JP); Tadahiko Kanoh, Wako (JP); Yuta Takada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 393 days.

(21) Appl. No.: 16/286,766

(22) Filed: Feb. 27, 2019

(65) Prior Publication Data
US 2019/0283757 A1 Sep. 19, 2019

(30) Foreign Application Priority Data
Mar. 13, 2018 (JP) .............................. JP2018-045823

(51) Int. Cl.
*B60W 30/18* (2012.01)
*G05D 1/02* (2020.01)
*G05D 1/00* (2006.01)

(52) U.S. Cl.
CPC ..... *B60W 30/18163* (2013.01); *G05D 1/0088* (2013.01); *G05D 1/0212* (2013.01);
(Continued)

(58) Field of Classification Search
CPC ....... B60W 30/18163; B60W 2554/80; B60W 30/165; G05D 1/0212; G05D 1/0088; G05D 1/0257; G05D 1/0231; G05D 2201/0213
See application file for complete search history.

(56) References Cited

U.S. PATENT DOCUMENTS 9,937,955 B2  4/2018 Ueda et al.
10,369,997 B2  8/2019 Igarashi et al.
(Continued)

FOREIGN PATENT DOCUMENTS

CA  2928073 A1  10/2016
CN  1954350 A   4/2007
(Continued)

OTHER PUBLICATIONS

Gehrig et al., "Collision Avoidance for Vehicle-Following Systems," Jun. 2007, IEEE, Transactions on Intelligent Transportations Systems, vol. 8, No. 2, pp. 233-244. (Year: 2007).*
(Continued)

*Primary Examiner* — Donald J Wallace
(74) *Attorney, Agent, or Firm* — Thomas | Horstemeyer, LLP

(57) ABSTRACT

A vehicle control apparatus controls movement of a vehicle in a lateral direction intersecting a direction in which the vehicle travels based on a movement trajectory of a preceding vehicle. The vehicle control apparatus includes a detection unit configured to detect a surrounding environment of the vehicle, and a preceding vehicle which travels ahead in the same lane in which the vehicle travels, a determination unit configured to determine whether or not the preceding vehicle straddles lanes or approaches within a set distance predetermined for the lanes based on lateral movement information of the preceding vehicle detected by the detection unit, and a control unit configured to control lateral movement of the vehicle based on a determination result of the determination unit and detection information of the detection unit.

18 Claims, 7 Drawing Sheets

(52) U.S. Cl.
CPC ....... *B60W 2554/80* (2020.02); *G05D 1/0231* (2013.01); *G05D 1/0257* (2013.01); *G05D 2201/0213* (2013.01)

(56) References Cited

U.S. PATENT DOCUMENTS

| | | |
|---|---|---|
| 2013/0021462 A1 | 1/2013 | Kadoya et al. |
| 2016/0257342 A1* | 9/2016 | Ueda .................... B62D 15/026 |
| 2016/0313738 A1 | 10/2016 | Kindo et al. |
| 2017/0066444 A1* | 3/2017 | Habu .................... B60W 30/12 |
| 2017/0068248 A1* | 3/2017 | Kobayashi ........... G05D 1/0246 |
| 2017/0197620 A1 | 7/2017 | Igarashi et al. |
| 2018/0130347 A1* | 5/2018 | Ricci .................... G08G 1/0112 |
| 2018/0170384 A1* | 6/2018 | Masui .................... G01S 13/86 |
| 2018/0257648 A1* | 9/2018 | Katoh .................... B60W 30/143 |
| 2018/0370527 A1* | 12/2018 | Rachor ................. B60W 50/14 |
| 2019/0204827 A1* | 7/2019 | Bhalla .................. G05D 1/0061 |
| 2019/0272742 A1* | 9/2019 | Ioli ........................ G08G 1/005 |
| 2020/0398840 A1* | 12/2020 | Kurihara ............... G08G 1/167 |

FOREIGN PATENT DOCUMENTS

| | | |
|---|---|---|
| CN | 102821690 A | 12/2012 |
| CN | 104260723 A | 1/2015 |
| CN | 106080744 A | 11/2016 |
| CN | 107010043 A | 8/2017 |
| EP | 3088281 A1 | 11/2016 |
| JP | 2003-276538 A | 10/2003 |
| JP | 2008-114672 A | 5/2008 |
| JP | 2016-088497 A | 5/2016 |
| JP | 2016-162196 A | 9/2016 |
| JP | 2017-121912 A | 7/2017 |

OTHER PUBLICATIONS

Japanese Office Action issued for Japanese Patent Application No. 2018-045823 dated Nov. 22, 2019 (with Partial Translation).
Chinese Office Action issued for Chinese Patent Application No. 201910136890.1 dated Dec. 16, 2021 (with Partial Translation).
Chinese Office Action issued for Chinese Patent Application No. 201910136890.1 dated Jun. 17, 2022 (with Partial Translation).

* cited by examiner

VEHICLE CONTROL APPARATUS, VEHICLE, VEHICLE CONTROL METHOD, AND STORAGE MEDIUM

CROSS-REFERENCE TO RELATED APPLICATION(S)

This application claims priority to and the benefit of Japanese Patent Application No. 2018-045823 filed on Mar. 13, 2018, the entire disclosure of which is incorporated herein by reference.

BACKGROUND OF THE INVENTION

Field of the Invention

The present invention relates to a vehicle control apparatus, a vehicle, a vehicle control method, and a storage medium, and specifically to a vehicle control technique for an automated driving vehicle.

Description of the Related Art

Japanese Patent Laid-Open No. 2016-162196 discloses a vehicle control apparatus for a preceding vehicle following control to allow a self-vehicle to follow a preceding vehicle, wherein the preceding vehicle following control is suspended when there is possibility that the preceding vehicle moves toward an opposite lane straddling a lane boundary line.

However, the configuration of Japanese Patent Laid-Open No. 2016-162196 does not take into consideration an obstacle which may be present in a lane in which the self-vehicle travels. In preceding vehicle following control, if the self-vehicle follows a preceding vehicle without clearly determining whether the preceding vehicle is moving in lateral direction to avoid an obstacle, or is moving in lateral direction to make a lane change to an adjacent lane, which is for travelling in the same direction, the self-vehicle may come close to another vehicle travelling in the adjacent lane, thereby causing an occupant of the self-vehicle to feel uneasy.

The present invention intends to at least solve the above described problems, and provide a vehicle control technique which allows to perform preceding vehicle following control of a self-vehicle based on determination result of lateral movement of a preceding vehicle.

SUMMARY OF THE INVENTION

According to one aspect of the present invention, there is provided a vehicle control apparatus for controlling the movement of a vehicle in a lateral direction intersecting a direction in which the vehicle travels based on a movement trajectory of a preceding vehicle, including: a detection unit configured to detect a surrounding environment of the vehicle, and a preceding vehicle which travels ahead in the same lane in which the vehicle travels; a determination unit configured to determine whether or not the preceding vehicle straddles lanes or approaches within a set distance predetermined for the lanes based on lateral movement information of the preceding vehicle detected by the detection unit; and a control unit configured to control lateral movement of the vehicle based on a determination result of the determination unit and detection information of the detection unit, wherein the control unit performs lateral movement control such that a target movement position in a lateral direction of the vehicle is adjusted in the same direction to the lateral position of the preceding vehicle when it is determined that the preceding vehicle does not straddle lanes or does not approach within a set distance predetermined for the lanes by the determination unit, and an object to be avoided is detected at a position in the same lane in a direction opposite to the lateral direction in which the preceding vehicle moves, based on information from the detection unit.

According to the present invention, it becomes possible to perform lateral movement control such that a target movement position is adjusted in the same direction to the lateral position of the preceding vehicle when it is determined that a preceding vehicle will not straddle lanes, or will not approach within a set distance predetermined for the lanes, and an object to be avoided is detected in the same lane. That is, according to the present invention, it becomes possible to perform preceding vehicle following control of the self-vehicle based on a more reliable determination result of lateral movement of a preceding vehicle.

DESCRIPTION OF THE EMBODIMENTS

Hereinafter, embodiments of the present invention will be described with reference to the drawings. Components shown in the embodiments are merely exemplification, and will not be limited to the below described embodiments.

(Configuration of Vehicle Control Apparatus)

Figure 1A:
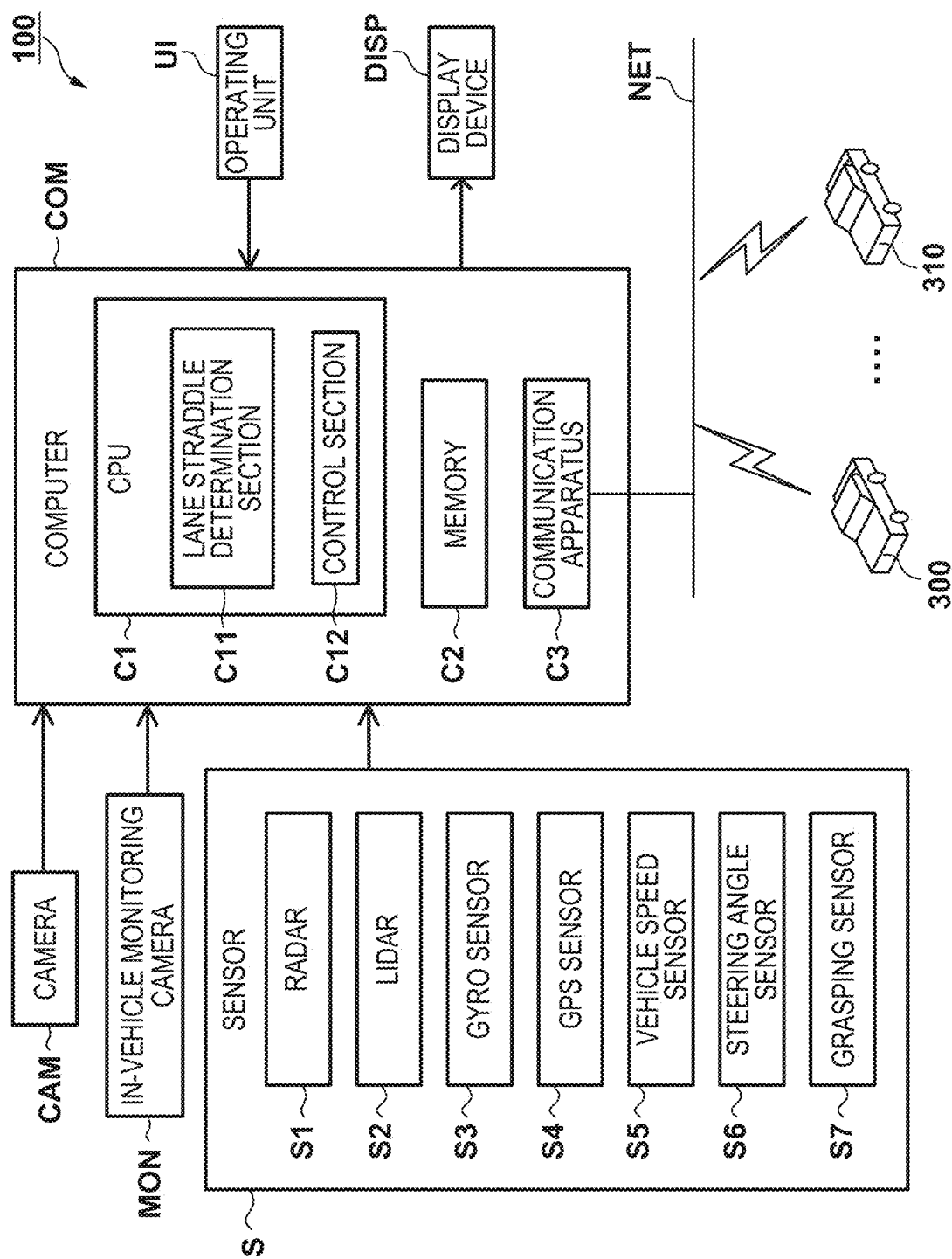
FIG. 1A is a block diagram to shows a basic configuration of a vehicle control apparatus.

FIG. 1A exemplifies a basic configuration of a vehicle control system including a vehicle control apparatus 100 for performing automated driving control of a vehicle, in which the vehicle control apparatus 100 includes a sensor system S, a camera CAM, an in-vehicle monitoring camera MON, a computer COM, a display device DISP, and an operating unit UI. The sensor system S includes, for example, a radar S1, a LIDAR S2 (Light Detection and Ranging), a gyro sensor S3, a GPS sensor S4, a vehicle speed sensor S5, a steering angle sensor S6, and a grasping sensor S7. The vehicle control apparatus 100 can control the movement of a vehicle in the lateral direction intersecting the direction in which the vehicle travels based on a movement trajectory of a preceding vehicle.

Moreover, the computer COM includes a CPU (C1) in charge of processing regarding automated driving control of the vehicle to be controlled (hereinafter, also referred to as a self-vehicle), a memory C2, and a communication apparatus C3 which is connected with a network NET and can communicates with other vehicles 300, 310, etc. travelling in the surrounding of the self-vehicle. A sensor system S and a camera CAM acquire various information on the vehicle and input it to the computer COM.

The CPU (C1) of the computer COM performs image processing on image information inputted from the camera CAM. The CPU (C1) extracts objects present around the self-vehicle and analyzes what kinds of objects are disposed around the self-vehicle based on the camera image information subjected to image processing and sensor information inputted from the sensor system S (radar S1, LIDAR S2). The CPU (C1) of the computer COM can determine the presence or absence of, for example, an obstacle ahead in the lane in which the self-vehicle is travelling, a preceding vehicle travelling ahead of the self-vehicle, other vehicles travelling in adjacent lanes, based on the analysis result.

Further, the gyro sensor S3 can detect rotational motion and posture of the self-vehicle, and the computer COM can determine a moving path of the self-vehicle from detection results of the gyro sensor S3 and vehicle speeds detected by the vehicle speed sensor S5. The GPS sensor S4 detects a present position (position information) of the self-vehicle in map information. The steering angle sensor S6 detects a steering angle of vehicle. Detection results of the steering angle sensor S6 are inputted to the computer COM, and the CPU (C1) computer can determine a steering angle of vehicle based on the detection results of the steering angle sensor S6.

The grasping sensor S7, which is for example incorporated in a steering wheel of vehicle, can detect whether or not the driver of vehicle is grasping the steering wheel. The grasping sensor S7 inputs the detected grasping information of steering wheel to the computer COM. The computer COM can determine whether or not the driver is grasping the steering wheel, that is, whether in a hands-on state or in a hands-off state, based on the grasping information of the steering wheel inputted from the grasping sensor S7.

The in-vehicle monitoring camera MON is disposed so as to be able to capture images inside the vehicle, and captures a face image of the driver of vehicle. The in-vehicle monitoring camera MON inputs captured appearance information of the driver into the computer COM. The computer COM can detect appearance information of driver such as face expression, a face orientation, a line of sight, opening/closing degree of eye, and driving posture, by performing image processing of the face image of the driver inputted from the in-vehicle monitoring camera MON. The computer COM can determine the arousal level of driver (whether in a state of falling asleep or capable of normal driving) based on the image processing of face image. When motion of the driver is not detected within a predetermined constant time period, it is determined that the driver is in a state of falling asleep. Further, a lamp is provided in the in-vehicle monitoring camera MON, and the computer COM turns on the lamp at a predetermined constant time interval. When the line of sight of the driver reacts against turning on of the lamp, the computer COM determines that the driver is in a state in which normal driving is possible.

The computer COM of the vehicle control apparatus 100 performs preceding vehicle following control whereby a vehicle (self-vehicle) is automatically controlled in steering and acceleration/deceleration so as to travel following a preceding vehicle which travels ahead in the same lane as one in which the self-vehicle travels. For example, the movement trajectory of the preceding vehicle is found out from the position of vehicle width center of the preceding vehicle identified by using the camera CAM and the sensor system S (radar S1, LIDAR S2), and the amount of change thereof per unit time. Next, control (preceding vehicle following control) to travel following the movement trajectory of a preceding vehicle is performed by changing steering angle, accelerator opening, brake pressure, gear change ratio, etc. such that the self-vehicle automatically travels along the obtained movement trajectory of the preceding vehicle.

When performing the preceding vehicle following control, the computer COM controls the movement of the self-vehicle in the direction in which the self-vehicle travels (longitudinal movement) between the self-vehicle and the preceding vehicle, and also controls the movement of the self-vehicle in the lateral direction (lateral movement) intersecting the direction in which the self-vehicle travels.

The CPU (C1) of the computer COM executes the control program stored in the memory C2, thereby functioning as a lane straddle determination section C11 and a control section C12. The lane straddle determination section C11 determines whether or not a preceding vehicle straddles lanes, or whether or not the preceding vehicle approaches within a set distance predetermined for the lanes, based on lateral movement information of the preceding vehicle detected by the detection system (the camera CAM and the sensor system S (radar S1, LIDAR S2)). The control section C12 controls the lateral movement of the vehicle 1 (self-vehicle) based on determination result of the lane straddle determination section C11 and detection information of the detection system.

The detection system (the sensor system S and the camera CAM) detects a surrounding environment of a vehicle, and a preceding vehicle that travels ahead in the same lane in which the vehicle is travelling, another vehicle travelling in an adjacent lane, or another vehicle travelling in an opposite lane.

The control section C12 performs lateral movement control such that the target movement position in the lateral direction of the vehicle is adjusted in the same direction to the lateral position of the preceding vehicle, when it is determined that the preceding vehicle will not straddle lanes, or will not approach within a set distance predetermined for the lanes based on the surrounding environment of the vehicle detected by the detection system (the sensor system S and the camera CAM) and the determination result of the lane straddle determination section C11, and an object to be avoided is detected at a position in the same lane in a direction opposite to the lateral direction in which the preceding vehicle moves.

When the vehicle control apparatus 100 shown in FIG. 1A is equipped on a vehicle, the computer COM may be disposed in an ECU for recognition processing or an ECU for image processing, which process information of the sensor system S, the camera CAM, and the in-vehicle monitoring camera MON, or may be disposed in an ECU for controlling the communication apparatus and the input/output apparatus, or may be disposed in an ECU in the control unit for performing driving control of vehicle or in an ECU for automatic driving. For example, as in FIG. 1B to be described below, the functions may be distributed to a plurality of ECUs which constitute the vehicle control apparatus 100, such as ECU for the sensor system S, ECU for the camera, ECU for the input/output apparatus, and ECU for automated driving.

Figure 1B:
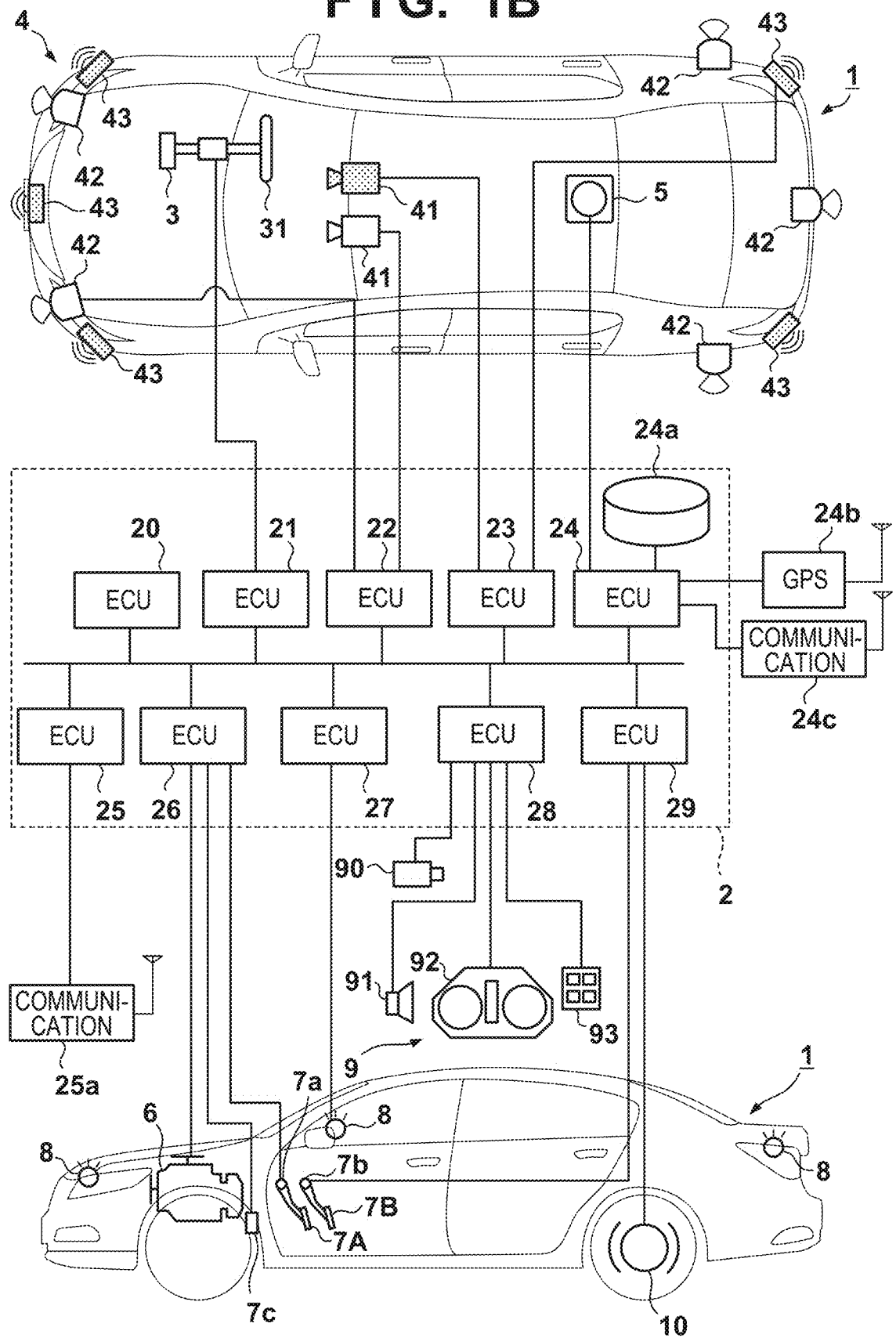
FIG. 1B shows an exemplary configuration of a control block diagram for controlling a vehicle.

FIG. 1B shows an exemplary configuration of a control block diagram of a vehicle control apparatus 100 for controlling the vehicle 1. In FIG. 1B, outline of the vehicle 1 is shown in a plan view and a side view. The vehicle 1 is, as an example, a sedan-type 4-wheel passenger car.

The control unit 2 of FIG. 1B controls each part of the vehicle 1. The control unit 2 includes a plurality of ECUs 20 to 29 which are communicably connected by an in-vehicle network. Each ECU (Electronic Control Unit) includes a processor represented by a CPU (Central Processing Unit), a storage device such as a semiconductor memory, an interface with external devices, and the like. The storage device stores a program to be executed by the processor, data to be used for processing by the processor, and the like. Each ECU may include a plurality of processors, storage devices, and interfaces.

Hereinafter, functions of which each ECU 20 to 29 is in charge are described. Note that the number of ECUs, and functions of which the ECUs are in charge can be appropriately designed for the vehicle 1, and they may be further subdivided or integrated than in the present embodiment.

ECU 20 executes vehicle control regarding automated driving of the vehicle 1 (self-vehicle) according to the present embodiment. In automated driving, either one of steering and acceleration/deceleration of the vehicle 1 is automatically controlled. Processing for specific control relating to the automated driving will be described in detail below.

In the vehicle control, ECU 20 controls automated driving of vehicle by setting an automated driving level based on a position of the vehicle 1 (self-vehicle) indicating a situation around the vehicle, a relative position of another vehicle present in the surrounding of the vehicle 1, information of roads in which the vehicle 1 travels, map information, and the like.

ECU 21 controls an electric power steering apparatus 3. The electric power steering apparatus 3 includes a mechanism for steering the front wheel in response to driving operation (steering operation) of the driver on the steering wheel 31. Moreover, the electric power steering apparatus 3 includes a motor for assisting steering operation or exerting driving force to automatically steer the front wheel, a sensor for detecting the steering angle, and the like. When the driving state of the vehicle 1 is the automated driving, ECU 21 automatically controls the electric power steering apparatus 3 in response to instruction from ECU 20, thereby controlling the moving direction of the vehicle 1.

ECUs 22 and 23 perform control of detection units 41 to 43 for detecting a situation around the vehicle, and information processing of detection results. The detection unit 41 is an image capture device (hereinafter, may also denoted as a camera 41) for detecting objects around the vehicle 1 by image capture. The camera 41 is attached to the interior side of the front windshield in a front part of the roof of the vehicle 1. By analyzing (image processing) images captured by the camera 41, it is possible to extract the contour of an object, and lane dividing lines (white lines) on the road.

The detection unit 42 (LIDAR detection unit), which is, for example, a LIDAR (Light Detection and Ranging) (hereinafter, may also be denoted as LIDAR 42), detects an object around the vehicle 1 and measures the distance to the object by means of light. In the case of the present embodiment, the LIDAR 42 is provided in plural numbers around the vehicle. In the example shown in FIG. 1B, for example, five of the LIDARs 42 are provided: one at each corner of the front part of the vehicle 1, one at the center of the rear part, and one at each side of the rear part. The detection unit 43 (radar detection unit), which is, for example, a millimeter wave radar (hereinafter, may also be denoted as radar 43), detects objects around the vehicle 1 and measures a distance to the object by means of radio wave. In the case of the present embodiment, the radars 43 is provided in plural numbers around the vehicle. In the example shown in FIG. 1B, for example, five of the radars 43 are provided: one at the center of the front part, one at each corner of the front part, and one at each corner of the rear part of the vehicle 1.

ECU 22 performs control of one camera 41 and each LIDAR 42, and information processing of detection results. ECU 23 performs control of the other camera 41 and each radar 43, and information processing of detection results. As a result of including two sets of apparatuses for detecting situations around vehicle, it is possible to improve reliability of detection result, and as a result of including different kinds of detection units, such as a camera, a LIDAR, and a radar, it is possible to diversely perform analysis of the surrounding environment of vehicle. Note that ECU 22 and ECU 23 may be integrated into one ECU.

ECU 24 performs control of a gyro sensor 5, a GPS sensor 24b, and a communication apparatus 24c, and information processing of detection results or communication results. The gyro sensor 5 detects rotational motion of the vehicle 1. It is possible to determine a moving path of vehicle 1 by the detection result of the gyro sensor 5, a wheel speed, and the like. The GPS sensor 24b detects a current position of the vehicle 1. The communication apparatus 24c wirelessly communicates with a sever apparatus for providing map information and traffic information, and thereby acquires these information. ECU 24 can access a database 24a of map information constructed in a storage device, and ECU 24 performs route search from a current position to a destination, or the like. The database 24a can be installed on a network, and the communication apparatus 24c can access the database 24a on the network to acquire information.

ECU 25 includes a communication apparatus 25a for vehicle-to-vehicle communication. The communication apparatus 25a performs wireless communication with other vehicles in the surrounding to exchange information between vehicles.

ECU 26 controls a power plant 6. The power plant 6, which is a mechanism to output driving force for rotating the driving wheels of the vehicle 1, includes, for example, an engine and a transmission. ECU 26 controls the output of the engine in response to driving operation (accelerator operation or accelerating operation) of the vehicle occupant (driver), which is detected by an operation detection sensor 7a provided in an accelerator pedal 7A, or switches the gear range of the transmission based on the information on vehicle speed, etc. detected by a vehicle speed sensor 7c. When the driving state of the vehicle 1 is automated driving, ECU 26 automatically controls the power plant 6 in response to instruction from ECU 20, to control acceleration/deceleration of the vehicle 1.

ECU 27 controls lighting equipment (a head light, a tail light, etc.) including direction indicators 8. In the case of FIG. 1B, the direction indicator 8 is provided at front parts, door mirrors, and rear parts of the vehicle 1.

ECU 28 performs control of an input/output apparatus 9, and image processing of a face image of the driver inputted from an in-vehicle monitoring camera 90. Where, the in-vehicle monitoring camera 90 corresponds to the in-vehicle monitoring camera MON of FIG. 1A. The input/output apparatus 9 outputs information for the vehicle occupant (driver) and receives input of information from the driver. A voice output apparatus 91 notifies the driver of information by voice. A display device 92 notifies the driver of information by displaying an image. The display device 92 is disposed, for example, in front of the driver seat, thereby constituting an instrument panel, etc. Note that, here, although voice and display are exemplified, information may be notified by vibration or light, etc. Moreover, information may be notified by combining two or more of voice, display, vibration, and light.

An input apparatus 93, which is a group of switches disposed at positions where they can be operated by the driver and for giving instructions to the vehicle 1, may include a voice input apparatus. The display device 92 corresponds to the previously described display device DISP of FIG. 1A, and the input apparatus 93 corresponds to the configuration of the operating unit UI of FIG. 1A.

ECU 29 controls a brake apparatus 10 and a parking brake (not shown), etc. The brake apparatus 10, which is, for example, a disc brake apparatus, is provided at each wheel of the vehicle 1 and decelerates or stops the vehicle 1 by applying resistance to the rotation of the wheels. ECU 29, for example, controls the operation of the brake apparatus 10 in correspondence to driving operation (braking operation) of the driver detected by an operation detection sensor 7b provided in a brake pedal 7B. When the driving state of the vehicle 1 is automated driving, ECU 29 automatically controls the brake apparatus 10 corresponding to instructions from ECU 20, thereby controlling the deceleration and stopping of the vehicle 1. The brake apparatus 10 and the parking brake can also be operated to maintain a stopped state of the vehicle 1. Moreover, when the transmission of the power plant 6 includes a parking lock mechanism, this can be operated to maintain the stopped state of the vehicle 1.

(Preceding Vehicle Following Control)

Figure 2:
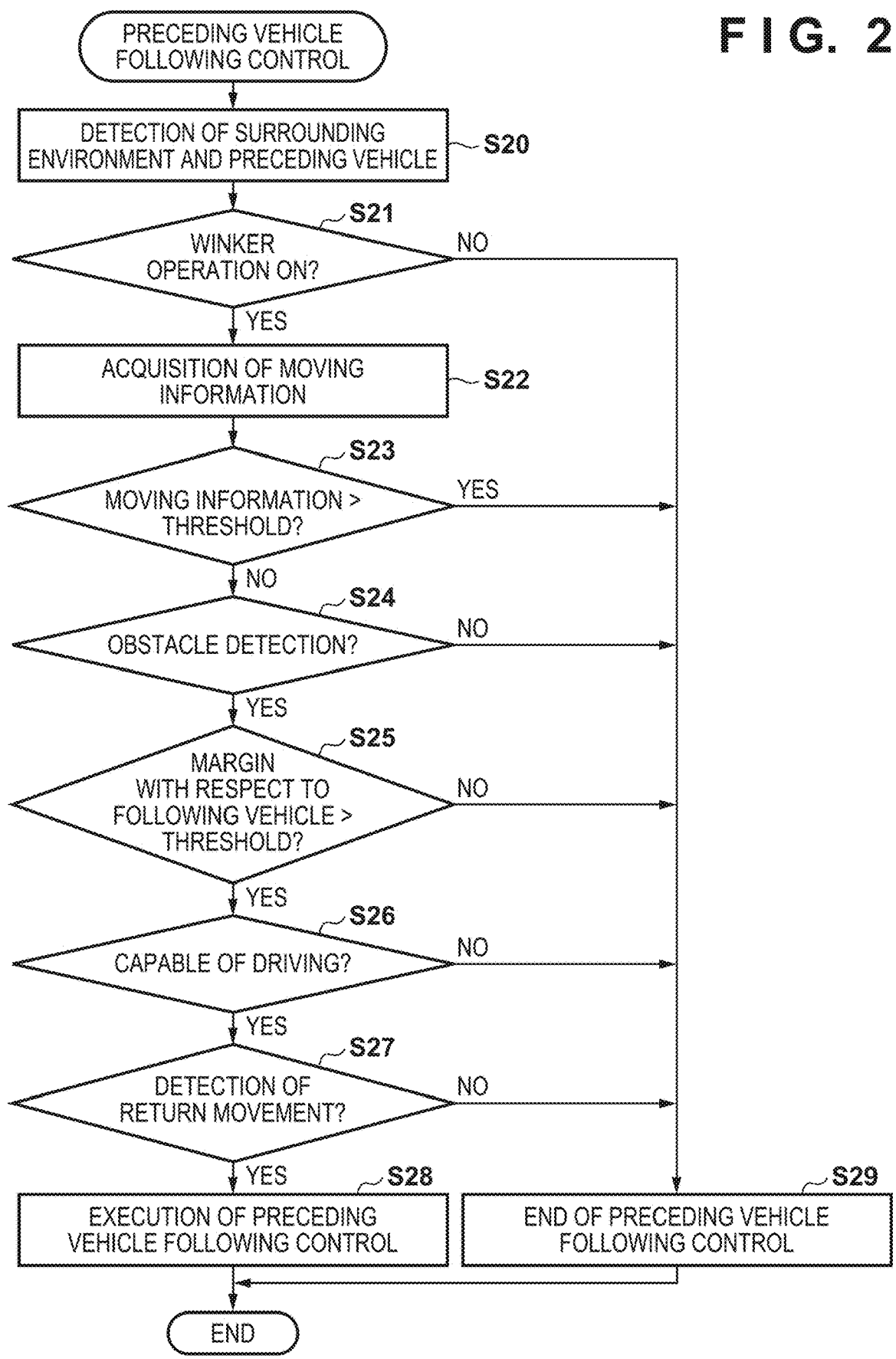
FIG. 2 illustrates the flow of processing of preceding vehicle following control in the vehicle control apparatus.

FIG. 2 illustrates the flow of processing of preceding vehicle following control in the vehicle control apparatus 100. First, in step S20, the sensor system S (radar S1, LIDAR S2) and the camera CAM detect the surrounding environment around the self-vehicle and a preceding vehicle, and input the detection result to the computer COM. The CPU (C1) of the computer COM performs image processing on the image information inputted from the camera CAM. The CPU (C1) extracts an object present around the self-vehicle based on camera image information subjected to image processing, and sensor information inputted from the sensor system S (radar S1, LIDAR S2).

The object to be extracted includes, for example, stationary objects (for example, road structures such as lane, curb, roadside strip, guardrail, medial strip, and stationary objects, such as obstacles present on the road) which do not move as time passes, and dynamic objects (for example, moving objects such as preceding vehicles travelling ahead of the self-vehicle, and other vehicles traveling in adjacent lanes) which move as time passes. The CPU (C1) extracts objects from the information acquired by the sensor system S (radar S1, LIDAR S2) and the camera CAM, and analyzes what kinds of objects are disposed around the self-vehicle.

Figure 3:
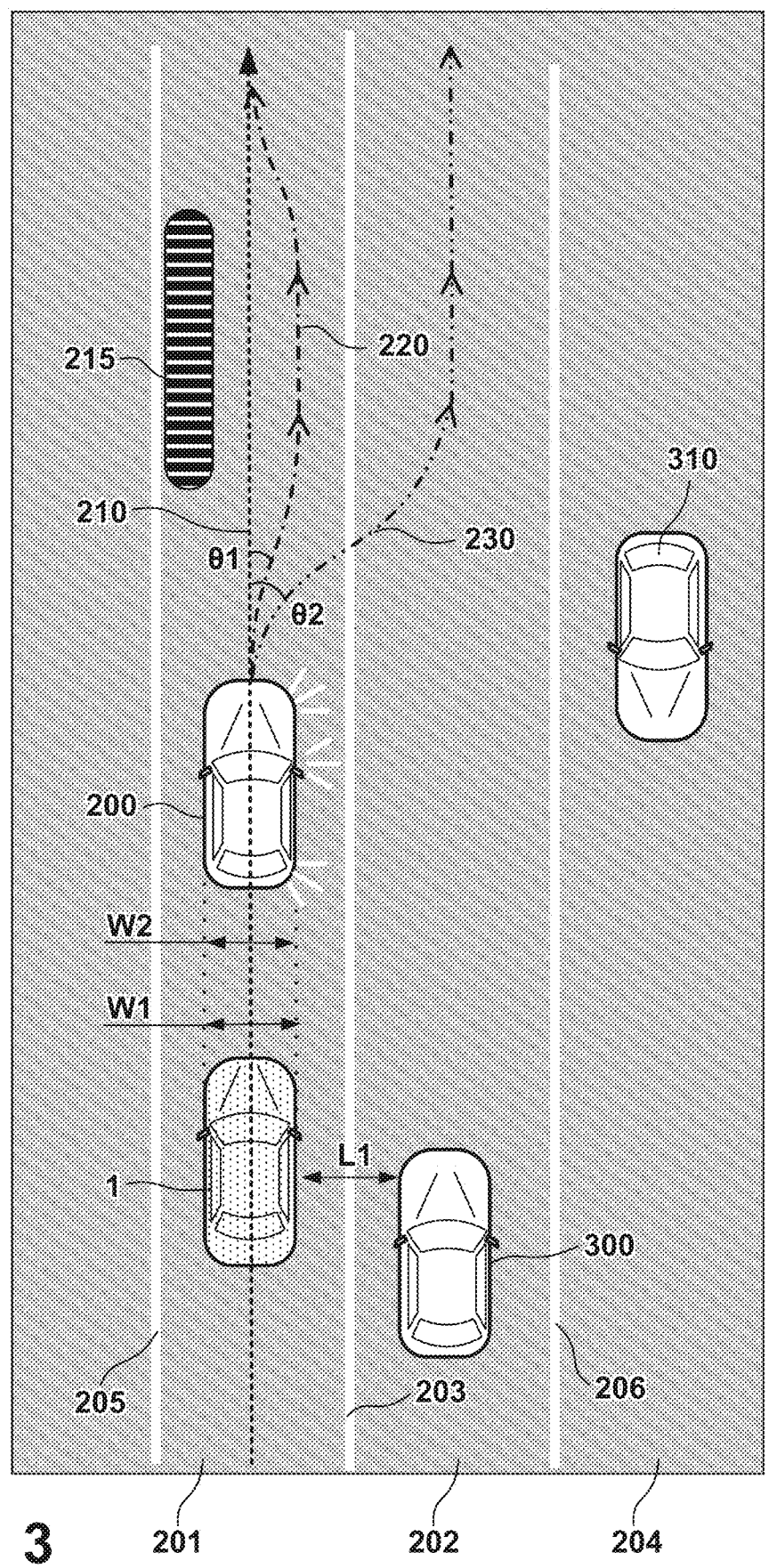
FIG. 3 schematically shows a travelling scene in which vehicles are travelling.

FIG. 3 schematically shows a travelling scene in which a vehicle (self-vehicle) is travelling. In FIG. 3, the vehicle 1 is travelling from the lower side to the upper side on the plane of page on the left side lane 201 of the lanes 201 and 202 which are indicated between a dividing line 205 (for example, a line corresponding to a roadside strip) and a dividing line 206 (for example, a line corresponding to a median strip, etc.) The lane 201, and the lane 202 adjacent to the lane 201 are divided by a boundary line 203 of lane.

As a result of the analysis by the CPU (C1), a preceding vehicle 200 which is travelling ahead in the same lane as the lane 201 in which the vehicle 1 is travelling has been detected. Where, it is supposed that the lateral movement of the preceding vehicle 200 has been detected. In the lane 201 in which the vehicle 1 is travelling, the presence of an obstacle 215 as a stationary object has been detected further ahead the preceding vehicle 200. Moreover, in the lane 202 (hereinafter, also referred to as an adjacent lane) adjacent to the lane 201, another vehicle 300 (following vehicle) travelling on a diagonally rear side (right side) has been detected.

When the travelling direction of the other vehicle 300 travelling in an adjacent lane (lane 202) adjacent to the lane 201, which is to be detected by the sensor system S (radar S1, LIDAR S2) and the camera CAM, is different from the direction in which the vehicle 1 (self-vehicle) travels, the control section C12 does not perform lateral movement control. Moreover, when the kind or color of the boundary line 203 between the lane 201 and the adjacent lane (lane 202 adjacent to the lane 201) which has been detected by the sensor system S (radar S1, LIDAR S2) and the camera CAM is a predetermined kind or color of the boundary line 203, the control section C12 ends the present processing without performing lateral movement control.

In step S21, when a lateral movement notification (a winker operation ON) of a preceding vehicle is detected based on the information acquired by the sensor system S (radar S1, LIDAR S2) and the camera CAM, which functions as the detection system, a lane straddle determination section C11 determines whether or not the preceding vehicle straddles lanes, or whether or not it approaches within a set distance predetermined for the lanes. That is, the lane straddle determination section C11 advances the process to step S22 when a lateral movement notification (winker operation ON) of the preceding vehicle 200 is detected (S21—Yes). On the other hand, since it is not possible to identify whether or not the lateral movement of the preceding vehicle is intentional movement when a winker operation is not notified (S21—No) in the determination in step S21, the process is advanced to step S29 when lateral movement is started without operating the winker, and the control section C12 ends the preceding vehicle following control for following the movement trajectory of the preceding vehicle 200.

To identify whether or not a lateral movement of a preceding vehicle is intentional movement, lateral movement information may be acquired by communication with the preceding vehicle 200. For example, a communication apparatus C3 may communicate lateral movement information of a preceding vehicle 200 with the preceding vehicle 200, and the lane straddle determination section C11 may determine whether or not the preceding vehicle straddles lanes, or whether or not it approaches within a set distance predetermined for the lanes after step S22 when lateral movement information is acquired through the communication of the communication apparatus C3.

In step S22, the lane straddle determination section C11 acquires lateral movement information of the preceding vehicle 200. The lane straddle determination section C11 acquires, as the lateral movement information of the preceding vehicle 200, for example, an amount of lateral movement of the preceding vehicle 200 with reference to a lane center 210 of a lane 201 in which the preceding vehicle 200 is travelling, a change rate of the amount of lateral movement acquired at a constant time interval, or an inclination of lateral movement direction of the preceding vehicle 200 with reference to the lane center 210 of the lane 201 in which the preceding vehicle 200 is travelling, based on information from the sensor system S (radar S1, LIDAR S2) and the camera CAM.

Next, in step S23, the lane straddle determination section C11 determines whether or not the preceding vehicle 200 straddles lanes (a boundary line 203 with the adjacent lane), or whether or not the preceding vehicle 200 approaches within a set distance predetermined for the lanes, based on lateral movement information of the preceding vehicle 200.

In FIG. 3, a movement trajectory 220 shows a movement trajectory which is laterally offset in the same lane (in the lane 201) in order that the preceding vehicle 200 avoids an obstacle 215, and when the preceding vehicle 200 travels in the movement trajectory 220, the preceding vehicle 200 travels while being laterally offset in the lane 201 without straddling lanes (a boundary line 203 with an adjacent lane) and, after having avoided the obstacle 215, travels in the movement trajectory along the lane center 210 of the lane 201.

Further, a movement trajectory 230 shows a movement trajectory when the preceding vehicle 200 changes lanes from the lane 201 to an adjacent lane 202. When the preceding vehicle 200 travels in the movement trajectory 230, the preceding vehicle 200 moves to the lane 202 from the lane 201 by straddling lanes (the boundary line 203 with an adjacent lane), and thereafter travels in a movement trajectory along the lane center of the lane 202. The CPU (C1) of the vehicle control apparatus 100 can acquire lateral movement information of the preceding vehicle 200 at a predetermined time interval ($\Delta t$), to find out in what kind of movement trajectory the preceding vehicle 200 travels.

As shown in the movement trajectories 220 and 230 in FIG. 3, the amounts of lateral movement and the change rates of the amount of lateral movement of the preceding vehicle 200 in the movement trajectory 220 and the movement trajectory 230 are different from each other with reference to the lane center 210 of the lane in which the preceding vehicle 200 is traveling. The amount of lateral movement in the movement trajectory 230 becomes larger than that in the movement trajectory 220, and the change rate of the amount of lateral movement in the movement trajectory 230 becomes larger than that in the movement trajectory 220.

As shown in FIG. 3, when the preceding vehicle 200 travels in the movement trajectory 220, the inclination of lateral movement direction of the preceding vehicle 200 with respect to the lane center 210 of the lane in which the preceding vehicle 200 is travelling will be an angle $\theta 1$. Moreover, when the preceding vehicle 200 travels in the movement trajectory 230, the inclination of lateral movement direction of the preceding vehicle 200 with respect to the lane center 210 of the lane in which the preceding vehicle 200 is travelling will be an angle $\theta 2$. The inclination $\theta 2$ when travelling in the movement trajectory 230 becomes larger than the inclination $\theta 1$ when travelling in the movement trajectory 220.

It is supposed that as an intermediate value between the movement trajectory 220 and the movement trajectory 230, a threshold of the amount of movement (an amount-of-movement threshold), a threshold of the change rate of amount of movement (a change rate threshold), and a threshold of the inclination (an inclination threshold) are preset in a memory C2 of the computer COM. The lane straddle determination section C11 compares acquired lateral movement information (the amount of movement, change rate of amount of movement, inclination) with a threshold in the memory C2, and when the movement information is larger than the threshold (S23—Yes), it is determined that the preceding vehicle 200 straddles lanes (the boundary line 203 with an adjacent lane), and advances the process to step S29.

In step S29, the control section C12 ends the preceding vehicle following control for following the movement trajectory of the preceding vehicle 200. The control section C12 causes a state transition to a control state in which automation level of automated driving is lower, or a request task level for the driver is higher compared with a control state in which the preceding vehicle following control is executed. In the control after the state transition, the control section C12 ends the preceding vehicle following control, and controls the travelling of the vehicle 1 under surround monitoring of the driver based on a higher request task level. Upon performing a state transition of control state, the control section C12 outputs a request task to the driver, for example, to switch from a hands-off state to a hands-on state.

On the other hand, if the movement information is not more than a threshold in the determination in step S23 (S23—No), the control section C12 determines that the preceding vehicle 200 does not straddle lanes (the boundary line 203 with an adjacent lane), or does not approach within a set distance predetermined for the lanes, and advances the process to step S24.

In step S24, the lane straddle determination section C11 determines whether or not an obstacle to be avoided has been detected based on the information from the sensor system S (radar S1, LIDAR S2) and the camera CAM. If no obstacle has been detected in step S24 (S24—No), it is determined that the lateral movement of the preceding vehicle 200 is not a lateral movement for avoiding an obstacle, and the process is advanced to step S29. In step S29, the control section C12 ends the preceding vehicle following control for following the movement trajectory of the preceding vehicle 200.

On the other hand, when an obstacle is detected in the determination of step S24, that is, when an object to be avoided (an obstacle 215 of FIG. 3) is detected at a position in the same lane and in an opposite direction (leftward in the plane of page in FIG. 3) to the lateral movement direction (rightward in the plane of page) in which the preceding vehicle 200 moves, based on information from the sensor system S (radar S1, LIDAR S2) and the camera CAM, the control section C12 performs lateral movement control (preceding vehicle following control) such that the target movement position of the vehicle 1 (self-vehicle) in the lateral direction is adjusted in the same direction to the lateral position of the preceding vehicle 200.

Further, execution of lateral movement control (lateral movement following control) may be conditioned on determination results of steps S25 to S27. It is supposed that a margin threshold to be used in step S25, and an arousal level threshold to be used in step S26 are preset in the memory C2 of the computer COM.

In step S25, the control section C12 acquires a margin (a lateral vehicle-to-vehicle distance) L1 between another vehicle 300 (following vehicle) which travels in the lane 202 adjacent to the lane 201, and the self-vehicle from information acquired by the sensor system S (radar S1, LIDAR S2) and the camera CAM.

Note that the margin (the lateral vehicle-to-vehicle distance) L1 will not be limited to the distance to another vehicle 300 (following vehicle), and may be, for example, a margin between the lane 202 (adjacent lane) adjacent to the lane 201 in which the vehicle 1 (self-vehicle) is travelling, and the vehicle 1. In the description below, it is supposed that L1 is the distance to another vehicle 300 (following vehicle).

The control section C12 compares an acquired margin (a lateral vehicle-to-vehicle distance) with a margin threshold, and when the margin (the lateral vehicle-to-vehicle distance) is not more than the margin threshold (S25—No), determines that when the vehicle 1 (self-vehicle) is moved laterally, the vehicle 1 (self-vehicle) will approach too close to another vehicle 300 (following vehicle) which is travelling in the adjacent lane 202, and advances the process to step S29. In step S29, the control section C12 ends the preceding vehicle following control for following the movement trajectory of the preceding vehicle 200.

On the other hand, when the margin between another vehicle 300 and the vehicle 1 (self-vehicle) is more than the margin threshold in the determination in step S25 (S25—Yes), the control section C12 determines that even if the vehicle 1 (self-vehicle) is moved in the lateral direction, a lateral vehicle-to-vehicle distance will be ensured between itself and the another vehicle 300 which travels in the adjacent lane 202, and advances the process to step S26. Note that when step S25 is yes (step 25—Yes), the control section C12 can perform lateral movement control (preceding vehicle following control) such that the target movement position of the vehicle 1 (self-vehicle) in the lateral direction is adjusted in the same direction to the lateral position of the preceding vehicle 200.

In step S26, the control section C12 determines whether or not the driver is in a state of capable of driving operation. That is, the control section C12 determines whether or not to perform the lateral movement control (preceding vehicle following control) based on the arousal level of the driver determined by the CPU (C1). If the arousal level of the driver determined by the CPU (C1) is a level of falling asleep, and when it is determined that the driver is in a state of not being able to drive normally (S26—No), the control section C12 determines that when the vehicle 1 (self-vehicle) is moved laterally, the driver may not be able to cope with a request task for the driver, and advances the process to step S29. In step S29, the control section C12 ends the preceding vehicle following control for following the movement trajectory of the preceding vehicle 200.

On the other hand, when the arousal level of the driver determined by CPU (C1) is a level of being able to drive normally (S26—Yes), the control section C12 determines that even when the vehicle 1 (self-vehicle) is moved laterally, the driver will be able to cope with the request task, and advances the process to step S27. Note that when step S26 is yes (step S26—yes), the control section C12 can also perform lateral movement control (preceding vehicle following control) such that the target movement position of the vehicle 1 (self-vehicle) in the lateral direction is adjusted in the same direction to the lateral position of the preceding vehicle 200.

Figure 6:
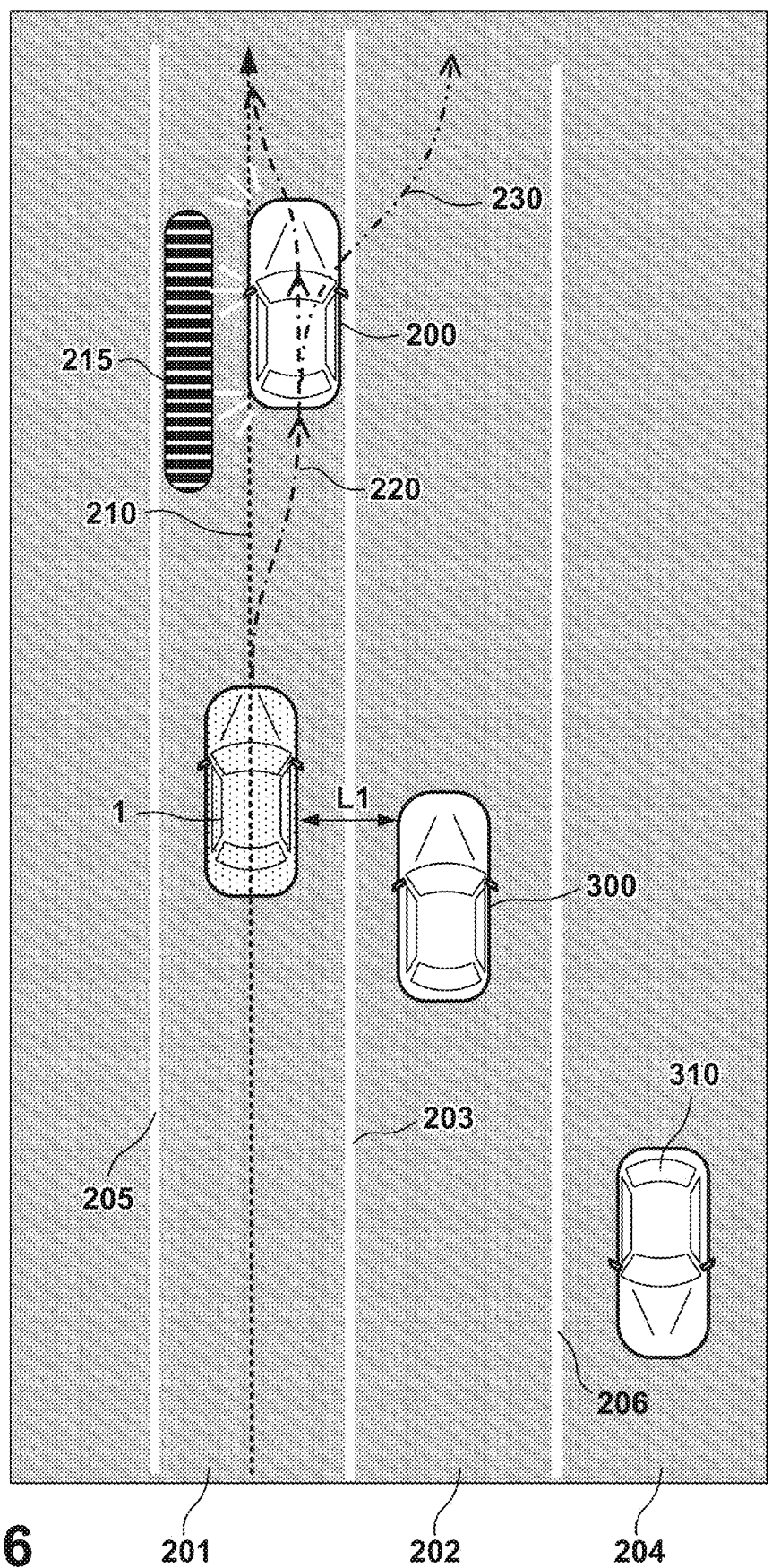
FIG. 6 schematically illustrates a travelling scene in which a preceding vehicle performs a return movement.

In step S27, the control section C12 determines whether or not to perform lateral movement control (preceding vehicle following control) based on detection result of a return movement in which the preceding vehicle 200 returns to the lane center 210. FIG. 6 schematically shows a travelling scene when the preceding vehicle 200 performs a return movement. When a return movement in which the preceding vehicle 200 returns from a movement trajectory 220 of lateral movement to the movement trajectory of the lane center 210 in which the preceding vehicle 200 was travelling before starting lateral movement is detected (S27—Yes) based on information from the sensor system S (radar S1, LIDAR S2) and the camera CAM, the control section C12 advances the process to step S28. That is, when a movement of the preceding vehicle 200 which has moved laterally, has passed by an obstacle 215, and thereafter moved from a position on the movement trajectory (movement trajectory 220), which has moved laterally, toward the lane center 210 of the lane 201 is detected by the detection system, the control section C12 advances the process to step S28.

Detection of a return movement can be determined based on, as in the processes of steps S23 and S24, an amount of movement in the return movement direction, a change rate of the amount of movement in the return movement direction acquired at a constant time interval, or an inclination of the return movement direction of the preceding vehicle 200 with respect to the movement trajectory 220 in which the preceding vehicle 200 is travelling laterally.

In determining whether or not the preceding vehicle 200 returns to the movement trajectory of the lane center 210, it is also possible that the vehicle 1 (self-vehicle) acquires movement information of return movement through vehicle-to-vehicle communication with the preceding vehicle 200, thereby making determination. The determination can also be made based on detection result of a movement notification (winker operation ON) of return movement of the preceding vehicle.

In step S28, the control section C12 performs lateral movement control (preceding vehicle following control) such that the target movement position of the vehicle 1 (self-vehicle) in the lateral direction is adjusted in the same direction to the lateral position of the preceding vehicle 200.

On the other hand, when no return movement is detected in the determination of step S27 (S27—No), for example, when the preceding vehicle 200 further moves from the movement trajectory 220 (changes lanes) in accordance with the movement trajectory 230, the control section C12 advances the process to step S29, and ends the preceding vehicle following control for following the movement trajectory of the preceding vehicle 200 in step S29.

(Correction of Movement Trajectory in Preceding Vehicle Following Control)

If the vehicle width of the vehicle 1 (self-vehicle) is not more than that of the preceding vehicle 200, when the preceding vehicle 200 passes by the side of an obstacle 215 at a spacing not less than a constant value along the movement trajectory 220 to avoid the obstacle 215, the vehicle 1 (self-vehicle) also can pass by the side of the obstacle 215 at a similar spacing.

However, when the vehicle width of the vehicle 1 (self-vehicle) is larger than that of the preceding vehicle 200, there may be a case in which the side of the self-vehicle approaches too close to the side of the obstacle 215 when passing by the side of the obstacle 215 even when the self-vehicle moves according to the movement trajectory 220 of the preceding vehicle 200.

In such a case, the control section C12 can generate a movement trajectory (corrected movement trajectory) obtained by correcting the movement trajectory 220 of the preceding vehicle 200, and can control the travelling of the vehicle 1 based on the corrected movement trajectory when it passes by the side of the obstacle 215.

Figure 4:
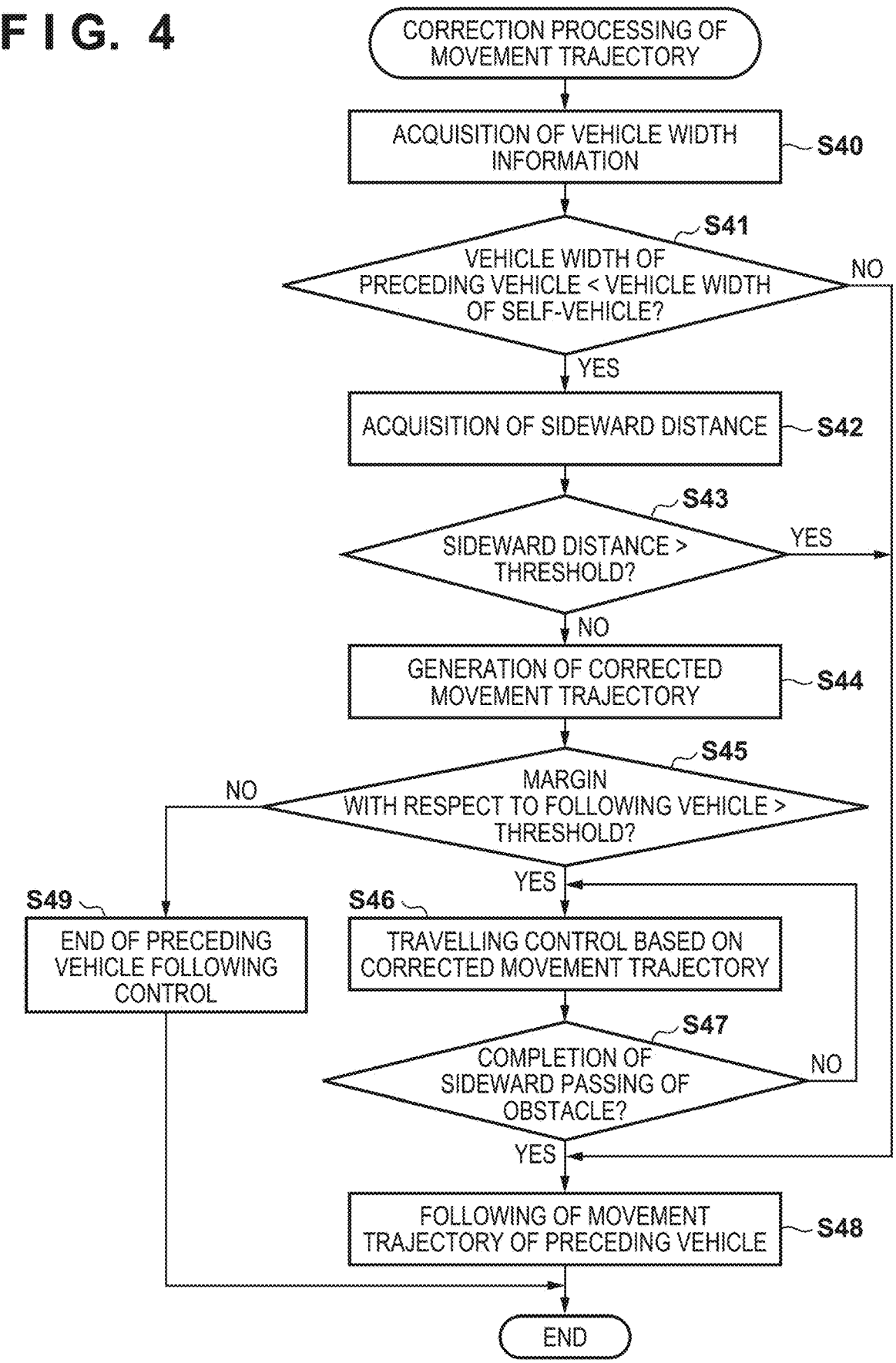
FIG. 4 illustrates the flow of correction processing of a movement trajectory in the vehicle control apparatus.
Figure 5:
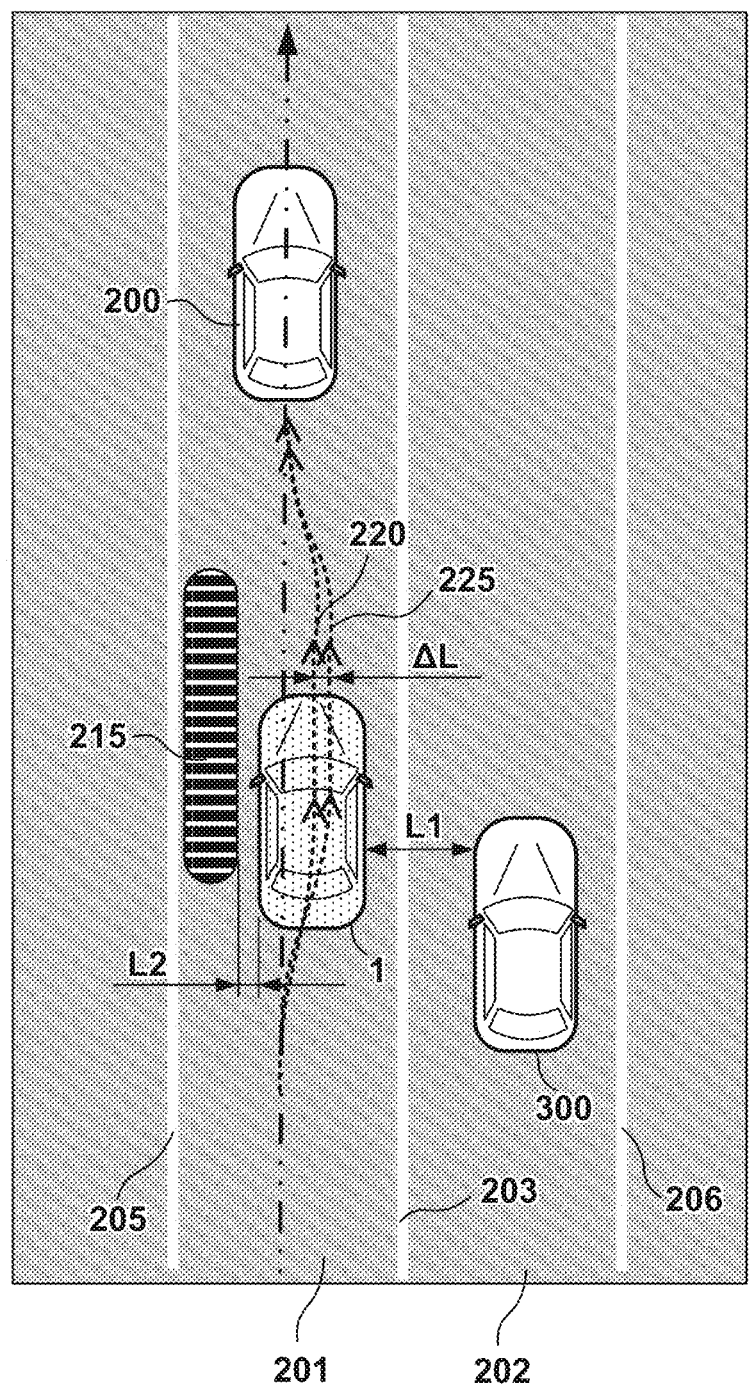
FIG. 5 schematically illustrates generation of a corrected movement trajectory.

FIG. 4 illustrates the flow of correction processing of the movement trajectory in the vehicle control apparatus 100, and FIG. 5 schematically illustrates generation of a corrected movement trajectory.

First, in step S40, the control section C12 acquires a vehicle width W2 (FIG. 3) of the preceding vehicle 200 from information acquired by the sensor system S (radar S1, LIDAR S2) and the camera CAM. Moreover, a vehicle width W1 of the vehicle 1 (self-vehicle) is stored in a memory C2 in advance, and the control section C12 acquires the vehicle width W1 of the self-vehicle from the memory C2.

In step S41, the control section C12 compares vehicle width information, and advances the process to step S48 when the vehicle width W1 of the self-vehicle is not more than the vehicle width W2 of the preceding vehicle 200 (S41—No). In step S48, the control section C12 performs travelling control to follow the movement trajectory 220 of the preceding vehicle 200 without performing correction processing of the movement trajectory.

On the other hand, when the vehicle width W1 of the self-vehicle is larger than the vehicle width W2 of the preceding vehicle 200 in the determination in step S41 (S41—Yes), the control section C12 advances the process to step S42.

In step S42, the control section C12 acquires a sideward distance L2 between the obstacle 215 and the side of the self-vehicle from information acquired by the sensor system S (radar S1, LIDAR S2) and the camera CAM.

In step S43, the control section C12 compares the sideward distance L2 with a sideward distance threshold (threshold), and advances the process to step S48 when the sideward distance L2 is larger than the sideward distance threshold. In this case, since the sideward distance L2 is ensured to have a larger distance than the sideward distance threshold even without correcting the movement trajectory 220, the control section C12 performs control to follow the movement trajectory 220 of the preceding vehicle 200 (S48) without correcting the movement trajectory 220.

On the other hand, when the sideward distance L2 is not more than the sideward distance threshold in the determination in step S43 (S43—No), the process is advanced to step S44.

Since when the vehicle 1 (self-vehicle) travels according to the movement trajectory 220 of the preceding vehicle 200, the side of the vehicle 1 (self-vehicle) approaches too close to the obstacle 215, the control section C12, in step S44, generates a corrected movement trajectory 225 in which the movement trajectory 220 is offset by an offset amount ΔL in a direction away from the obstacle 215 (to the side of the adjacent lane 202).

The offset amount ΔL can be changed according to the size of the obstacle 215. For example, it is possible to set a ΔL (large) as the offset amount ΔL when the obstacle 215 is an obstacle larger than the size (for example, vehicle height, vehicle length, etc.) of the self-vehicle, and set a ΔL (small) which is smaller than the ΔL (large) as the offset amount ΔL when the obstacle 215 is an obstacle smaller than the size of the self-vehicle. This allows to reduce uneasiness of the occupants which is caused as a result of approaching too close to a large obstacle when passing by the side of the obstacle 215.

In step S45, the control section C12 determines whether or not a margin (lateral vehicle-to-vehicle distance) is larger than a margin threshold between the self-vehicle and another vehicle 300 (following vehicle) which travels in the adjacent lane 202 when the self-vehicle travels in the corrected movement trajectory 225. The control section C12 acquires a margin (lateral vehicle-to-vehicle distance) L1 between the another vehicle 300 (following vehicle) which travels in the lane 202 adjacent to the lane 201, and the self-vehicle from information acquired by the sensor system S (radar S1, LIDAR S2) and the camera CAM. Here, the margin (lateral vehicle-to-vehicle distance) L1 is not limited to the distance to another vehicle 300 (following vehicle), and may be, for example, a margin between the lane 202 (adjacent lane) adjacent to the lane 201 in which the vehicle 1 (self-vehicle) is travelling, and the vehicle 1. Hereinafter, description will be made supposing that L1 is a distance to another vehicle 300 (following vehicle).

The control section C12 compares the acquired margin (lateral vehicle-to-vehicle distance) L1 with the margin threshold, and when the margin (lateral vehicle-to-vehicle distance) L1 is not more than the margin threshold (S45—No), determines that the self-vehicle will approach too close to another vehicle 300 (following vehicle) travelling in the adjacent lane 202 when travelling in the corrected movement trajectory 225, thus advancing the process to step S49.

In step S49, the control section C12 ends the preceding vehicle following control for following the movement trajectory of the preceding vehicle 200, thus ending the present process. In this case, since even if a sideward distance to the obstacle 215 is ensured by correcting the movement trajectory 220, the margin (lateral vehicle-to-vehicle distance) to another vehicle 300 travelling in the adjacent lane cannot be ensured, so the control section C12 causes a state transition to a control state in which automation level of automated driving is lower, or a request task level for the driver is higher compared with a control state in which the preceding vehicle following control is executed. In the control after the state transition, the control section C12 ends the preceding vehicle following control, and controls the travelling of the vehicle 1 under surround monitoring of driver based on a higher request task level. Upon performing a state transition of control state, the control section C12 outputs a request task to the driver, for example, to switch from a hands-off state to a hands-on state.

On the other hand, when the margin (lateral vehicle-to-vehicle distance) L1 is larger than the margin threshold in step S45 (S45—Yes), the process is advanced to step S46.

In step S46, the control section C12 controls the travelling of the vehicle 1 based on the corrected movement trajectory 225 which has been generated. This makes it possible to perform travelling control in a state in which a predetermined distance to both the obstacle 215 and the following vehicle is ensured.

In step S47, the control section C12 determines whether or not sideward passing of the obstacle 215 has been completed based on information acquired by the sensor system S (radar S1, LIDAR S2) and the camera CAM. If the sideward passing has not been completed (S47—No), the process is returned to step S46 and travelling control of the vehicle 1 based on the corrected movement trajectory 225 is continued. On the other hand, when sideward passing of the obstacle 215 has been completed in the determination in step S47 (S47—Yes), the process is advanced to step S48.

In step S48, the control section C12 performs travelling control to follow the movement trajectory 220 of the preceding vehicle 200. In steps S46 and S47, if travelling control of the vehicle 1 based on the corrected movement trajectory 225 is performed, the control section C12 switches from the corrected movement trajectory 225 to the movement trajectory 220 of the preceding vehicle 200 to perform the travelling control of the vehicle 1. As a result of this, even in a case in which when the self-vehicle follows the preceding vehicle 200 based on its movement trajectory 220, a state in which the self-vehicle approaches too close to the obstacle 215 occurs, it becomes possible to perform travelling control while ensuring a predetermined distance to the obstacle 215 by temporarily changing the movement trajectory 220 to the corrected movement trajectory 225.

Other Embodiments

Although some preferable embodiments have been presented as examples so far, the present embodiment will not be limited to these examples and part of which can be altered within a range not departing from the spirit of the present invention. For example, it is possible to combine the content of each embodiment with other elements depending on its purposes, uses, and the like, and also possible to combine the content of a certain embodiment with a part of the content of another embodiment. Further, individual terms recited in the present specification are used merely for the purpose of explaining the present invention, and it is without saying that the present invention will not be limited to strict meaning of each term and can include equivalents thereof.

Moreover, a program to realize one or more functions described in each embodiment is provided to a system or an apparatus via a network or a storage medium, and one or more processors in a computer of the system or the apparatus can read out the program and execute it. The present invention can also be implemented according to such an aspect.

Summary of Embodiments

Configuration 1. The vehicle control apparatus of the above described embodiment is a vehicle control apparatus (for example, 100) for controlling the movement of a vehicle in a lateral direction intersecting a direction in which a vehicle travels based on a movement trajectory of a preceding vehicle, including:

a detection unit (for example, CAM, S1, S2) configured to detect a surrounding environment of the vehicle, and a preceding vehicle which travels ahead in the same lane in which the vehicle travels;

a determination unit (for example, C11) configured to determine whether or not the preceding vehicle straddles lanes or approaches within a set distance predetermined for the lanes based on lateral movement information of the preceding vehicle detected by the detection unit (CAM, S1, S2); and a control unit (for example, C12) configured to control lateral movement of the vehicle based on a determination result of the determination unit (C11) and detection information of the detection unit (CAM, S1, S2), wherein the control unit (C12) performs lateral movement control such that a target movement position of the vehicle in a lateral direction is adjusted in the same direction to the lateral position of the preceding vehicle when it is determined that the preceding vehicle does not straddle lanes or does not approach within a set distance predetermined for the lanes by the determination unit (C11), and an object to be avoided is detected at a position in the same lane in a direction opposite to the lateral direction in which the preceding vehicle moves, based on information from the detection unit (CAM, S1, S2).

According to the vehicle control apparatus of Configuration 1, it becomes possible to perform lateral movement control such that a target movement position in a lateral direction of the vehicle is adjusted in the same direction to the lateral position of the preceding vehicle when it is determined that the preceding vehicle does not straddle lanes or does not approach within a set distance predetermined for the lanes, and an object to be avoided is detected at a position in the same lane.

That is, according to the vehicle control apparatus of Configuration 1, it becomes possible to perform preceding vehicle following of a self-vehicle based on more reliable determination result of lateral movement of a preceding vehicle.

Configuration 2. The vehicle control apparatus (100) of the above described embodiment, wherein the determination unit (C11) determines whether or not the preceding vehicle straddles lanes, or approaches within a set distance predetermined for the lanes based on a comparison between an amount of lateral movement of the preceding vehicle with reference to a lane center of a lane in which the preceding vehicle is travelling, and a threshold.

According to the vehicle control apparatus of Configuration 2, it becomes possible to determine a movement trajectory based on an amount of lateral movement of the preceding vehicle, and thereby determine whether or not the preceding vehicle straddles lanes, or approaches within a set distance predetermined for the lanes.

Configuration 3. The vehicle control apparatus (100) of the above described embodiment, wherein the determination unit (C11) determines whether or not the preceding vehicle straddles lanes, or approaches within a set distance predetermined for the lanes, based on comparison between a change rate of the amount of lateral movement of the preceding vehicle acquired at a constant time interval, and a threshold.

According to the vehicle control apparatus of Configuration 3, it becomes possible to determine a movement trajectory based on a change rate of the amount of lateral movement of the preceding vehicle, and thereby determine whether or not the preceding vehicle straddles lanes, or approaches within a set distance predetermined for the lanes.

Configuration 4. The vehicle control apparatus (100) of the above described embodiment, wherein the determination unit (C11) determines whether or not the preceding vehicle straddles lanes, or approaches within a set distance predetermined for the lanes based on comparison between inclination of lateral movement direction of the preceding vehicle with respect to a lane center of the lane in which the preceding vehicle is travelling, and a threshold.

According to the vehicle control apparatus of Configuration 4, it becomes possible to determine a movement trajectory based on an inclination of the lateral movement direction of the preceding vehicle, and thereby determine whether or not the preceding vehicle straddles lanes, or approaches within a set distance predetermined for the lanes.

Configuration 5. The vehicle control apparatus (100) of the above described embodiment, further including: a communication unit configured to communicate lateral movement information of the preceding vehicle to and from the preceding vehicle, wherein the determination unit (C11) determines whether or not the preceding vehicle straddles lanes, or approaches within a set distance predetermined for the lanes when the lateral movement information is acquired through communication by the communication unit.

Configuration 6. The vehicle control apparatus (100) of the above described embodiment, wherein the determination unit (C11) determines whether or not the preceding vehicle straddles lanes, or approaches within a set distance predetermined for the lanes when a lateral movement notification of the preceding vehicle is detected based on a detection result of the detection unit (CAM, S1, S2).

According to the vehicle control apparatus of Configuration 5 or 6, it becomes possible to prevent erroneous determination by determining whether or not lateral movement of a preceding vehicle is intentional lateral movement, and thereby perform preceding vehicle following control of the self-vehicle based on a more reliable determination result of lateral movement of the preceding vehicle.

Configuration 7. The vehicle control apparatus (100) of the above described embodiment, wherein the control unit (C12) performs the lateral movement control when a margin between an adjacent lane adjacent to the lane and the vehicle, or a margin between another vehicle travelling in the adjacent lane and the vehicle, the margin being detected by the detection unit (CAM, S1, S2), is larger than a predetermined margin threshold.

According to the vehicle control apparatus of Configuration 7, it is possible to ensure a lateral vehicle-to-vehicle distance to another vehicle travelling in an adjacent lane even when the vehicle is laterally moved, and thus more safely perform preceding vehicle following control of the self-vehicle.

Configuration 8. The vehicle control apparatus (100) of the above described embodiment, further including:

an image capture unit configured to be disposed so as to be able to capture an image of an interior of the vehicle, and capture a face image of a driver of the vehicle; and a processing unit configured to determine an arousal level of the driver based on image processing of the face image, wherein the control unit (C12) performs the lateral movement control when it is determined that the arousal level is a level of being able to drive normally.

According to the vehicle control apparatus of Configuration 8, it becomes possible to perform preceding vehicle following control of the self-vehicle in a safer condition by performing lateral movement control of vehicle in a state in which normal driving by the driver is possible.

Configuration 9. The vehicle control apparatus (100) of the above described embodiment, wherein when the detection unit (CAM, S1, S2) detects that the preceding vehicle which has moved in the lateral direction moves toward a lane center of the lane from a position on the movement trajectory which has been moved in the lateral direction, after passing by the side of the object, the control unit (C12) performs the lateral movement control.

According to the vehicle control apparatus of Configuration 9, as a result of detecting a return movement of the preceding vehicle from a position on the movement trajectory which has been moved in the lateral direction toward the lane center, it becomes possible to perform preceding vehicle following control of the self-vehicle based on more accurate determination result of lateral movement of the preceding vehicle.

Configuration 10. The vehicle control apparatus (100) of the above described embodiment, wherein the control unit (C12) does not perform the lateral movement control when a travelling direction of another vehicle travelling in an adjacent lane adjacent to the lane, which is detected by the detection unit (CAM, S2, S2), is different from the direction in which the vehicle travels.

According to the vehicle control apparatus of Configuration 10, as a result of controlling not to perform lateral movement control when the travelling direction of another vehicle is different from the travelling direction of the self-vehicle, it becomes possible to perform preceding vehicle following control of the self-vehicle while alleviating uneasiness of the driver at the time of lateral movement toward another vehicle that is oncoming.

Configuration 11. The vehicle control apparatus (100) of the above described embodiment, wherein when a kind or color of a boundary line between the lane and an adjacent lane detected by the detection unit (CAM, S1, S2) is a predetermined kind or color of the boundary line, the control unit (C12) does not perform the lateral movement control.

According to the vehicle control apparatus of Configuration 11, as a result of not performing the lateral movement control when deviation from the travelling lane is restricted by the kind or color of the boundary line, it becomes possible to perform preceding vehicle following control of the self-vehicle in a safer condition.

Configuration 12. The vehicle control apparatus (100) of the above described embodiment, wherein the control unit (C12) acquires a sideward distance between the object and the side of the vehicle from information acquired by the detection unit (CAM, S1, S2), when a vehicle width of the vehicle is larger than a vehicle width of the preceding vehicle.

Configuration 13. The vehicle control apparatus (100) of the above described embodiment, wherein the control unit (C12) generates a corrected movement trajectory which is offset from the movement trajectory of the preceding vehicle in a direction away from the object when the sideward distance is not more than a threshold.

Configuration 14. The vehicle control apparatus (100) of the above described embodiment, wherein the control unit (C12) generates a corrected movement trajectory by altering an offset amount of the offsetting depending on the size of the object with respect to the vehicle.

Configuration 15. The vehicle control apparatus (100) of the above described embodiment, wherein the control unit (C12) controls travelling of the vehicle based on the corrected movement trajectory when a margin between an adjacent lane adjacent to the lane and the vehicle, or a margin between another vehicle which travels in the adjacent lane and the vehicle is larger than a predetermined margin threshold when the vehicle travels in the corrected movement trajectory.

Configuration 16. The vehicle control apparatus (100) of the above described embodiment, wherein the control unit (C12) determines whether or not sideward passing of the object is completed based on the information acquired by the detection unit (CAM, S1, S2), and when the sideward passing is not completed, continues travelling control of the vehicle based on the corrected movement trajectory.

Configuration 17. The vehicle control apparatus (100) of the above described embodiment, wherein when sideward passing of the object is completed, the control unit (C12) performs travelling control of the vehicle by switching the movement trajectory, which provides a reference for preceding vehicle following travelling, from the corrected movement trajectory to the movement trajectory of the preceding vehicle.

According to the vehicle control apparatus of Configurations 12 to 17, as a result of generating a corrected movement trajectory in which the movement trajectory of the preceding vehicle is corrected when the vehicle width of the self-vehicle is larger than the vehicle width of a preceding vehicle, and performing travelling control based on the corrected movement trajectory, it becomes possible to travel in a state in which a constant sideward distance to an object which is an obstacle to be avoided is ensured.

This allows to reduce uneasiness of an occupant, which is caused as a result of approaching too close to an object, which is an obstacle to be avoided, when passing by the side of the object.

Configuration 18. The vehicle (for example, 1) of the above described embodiment, including the vehicle control apparatus (for example, 100) according to any one of Configurations 1 to 17.

According to the vehicle of Configuration 18, it is possible to provide a vehicle which enables to perform preceding vehicle following of a self-vehicle based on more reliable determination result of lateral movement of a preceding vehicle.

Configuration 19. A vehicle control method of the vehicle control apparatus (100) of the above described embodiment is a vehicle control method of a vehicle control apparatus for controlling the movement of a vehicle in a lateral direction intersecting a direction in which the vehicle travels based on a movement trajectory of a preceding vehicle, including:

a detection step in which a detection unit (for example, CAM, S1, S2) detects a surrounding environment of the vehicle, and a preceding vehicle which travels ahead in the same lane in which the vehicle travels;

a determination step in which a determination unit (for example, C11) determines whether or not the preceding vehicle straddles the lanes, or approaches within a set distance predetermined for the lanes based on lateral movement information of the preceding vehicle detected in the detection step; and a control step in which a control unit (for example, C12) controls lateral movement of the vehicle based on a determination result in the determination step and detection information in the detection step, wherein, in the control step, the control unit performs lateral movement control such that a target movement position in a lateral direction of the vehicle is adjusted in the same direction to the lateral position of the preceding vehicle when it is determined that the preceding vehicle does not straddle lanes or does not approach within a set distance predetermined for the lanes in the determination step, and when an object to be avoided is detected at a position in the same lane in a direction opposite to the lateral direction in which the preceding vehicle moves in the detection step.

According to the vehicle control method of Configuration 19, when it is determined whether or not the preceding vehicle straddles lanes, or approaches within a set distance predetermined for the lanes based on lateral movement information of a preceding vehicle, and when it is determined that a preceding vehicle does not straddle lanes, or does not approach within a set distance predetermined for the lanes, and an object to be avoided is detected in the same lane, it becomes possible to perform lateral movement control such that a target movement position is adjusted in the same direction to the lateral position of the preceding vehicle.

That is, according to the vehicle control method of Configuration 19, it becomes possible to perform preceding vehicle following control of the self-vehicle based on a more reliable determination result of lateral movement of a preceding vehicle.

Configuration 20. The vehicle control program of the above described embodiment causes a computer (for example, CPU) to execute each step of the vehicle control method according to Configuration 19.

According to the program of Configuration 20, it is possible to provide a program which enables to perform preceding vehicle following of a self-vehicle based on more reliable determination result of lateral movement of a preceding vehicle.

What is claimed is:

1. A vehicle control apparatus for controlling the movement of a vehicle in a lateral direction intersecting a direction in which the vehicle travels based on a movement trajectory of a preceding vehicle, comprising:

a detector configured to detect a surrounding environment of the vehicle, and a preceding vehicle which travels ahead in the same lane in which the vehicle travels, and a following vehicle which travels on a diagonally rear side of the vehicle;

at least one processor; and at least one memory storing instructions that, when executed by the at least one processor, cause the at least one processor to:

determine whether or not the preceding vehicle straddles lanes or approaches within a set distance predetermined for the lanes based on lateral movement information of the preceding vehicle detected by the detector;

control lateral movement of the vehicle based on a determination result of whether or not the preceding vehicle straddles lanes or approaches within the set distance predetermined for the lanes and detection information of the detector, acquire a sideward distance between an object to be avoided and the side of the vehicle from information acquired by the detector, when a vehicle width of the vehicle is larger than a vehicle width of the preceding vehicle; and generate a corrected movement trajectory which is offset from the movement trajectory of the preceding vehicle in a direction away from the object when the sideward distance is not more than a threshold, wherein the lateral movement is controlled based on the movement trajectory of the preceding vehicle such that a target movement position in a lateral direction of the vehicle is adjusted in a same direction to a lateral position of the preceding vehicle which moves in a lateral direction when it is determined that the preceding vehicle does not straddle lanes or does not approach within a set distance predetermined for the lanes, and the object to be avoided is detected at a position in the same lane in a direction opposite to the lateral direction in which the preceding vehicle moves, and a margin between the following vehicle and the vehicle is larger than the predetermined margin threshold, based on information from the detector, the lateral movement is controlled based on the corrected movement trajectory in a state in which a predetermined distance to both the object and the following vehicle is ensured, when the vehicle width of the vehicle is larger than the vehicle width of the preceding vehicle, and the sideward distance is not more than the threshold, and the margin is larger than the predetermined margin threshold, and in a case which sideward passing of the object is completed based on the information acquired by the detector, the corrected movement trajectory is changed to the movement trajectory of the preceding vehicle in the controlling of the lateral movement.

2. The vehicle control apparatus according to claim 1, wherein the determining whether or not the preceding vehicle straddles lanes, or approaches within a distance predetermined for the lanes is based on a comparison between an amount of lateral movement of the preceding vehicle with reference to a lane center of a lane in which the preceding vehicle is travelling, and a threshold.

3. The vehicle control apparatus according to claim 1, wherein the determining whether or not the preceding vehicle straddles lanes, or approaches within a distance predetermined for the lanes is based on comparison between a change rate of the amount of lateral movement of the preceding vehicle acquired at a constant time interval, and a threshold.

4. The vehicle control apparatus according to claim 1, wherein the determining whether or not the preceding vehicle straddles lanes, or approaches within a distance predetermined for the lanes is based on comparison between inclination of lateral movement direction of the preceding vehicle with respect to a lane center of the lane in which the preceding vehicle is travelling, and a threshold.

5. The vehicle control apparatus according to claim 1, wherein the at least one memory further stores instructions that, when executed by the at least one processor, cause the at least one processor to:
communicate lateral movement information of the preceding vehicle to and from the preceding vehicle,
wherein the determining whether or not the preceding vehicle straddles lanes, or approaches within a distance predetermined for the lanes occurs when the lateral movement information is acquired through communication of the lateral movement information.

6. The vehicle control apparatus according to claim 1, wherein the determining whether or not the preceding vehicle straddles lanes, or approaches within a distance predetermined for the lanes occurs when a lateral movement notification of the preceding vehicle is detected based on a detection result of the detector.

7. The vehicle control apparatus according to claim 6, wherein after the lateral movement notification of the preceding vehicle is detected, any one processing of a determination of a movement state of the preceding vehicle in the lateral direction, a determination of whether or not an obstacle to be avoided has been detected, or an acquisition of the margin between the following vehicle and the vehicle, is performed.

8. The vehicle control apparatus according to claim 1, further comprising:
an image capture unit configured to be disposed so as to be able to capture an image of an interior of the vehicle, and capture a face image of a driver of the vehicle; and
wherein the at least one memory further stores instructions that, when executed by the at least one processor, cause the at least one processor to:
determine an arousal level of the driver based on image processing of the face image,
wherein the lateral movement control is performed when it is determined that the arousal level is a level of being able to drive normally.

9. The vehicle control apparatus according to claim 1, wherein the lateral movement control is performed when the detector detects that the preceding vehicle which has moved in the lateral direction moves toward a lane center of the lane from a position on the movement trajectory which has been moved in the lateral direction, after passing by the side of the object.

10. The vehicle control apparatus according to claim 1, wherein the lateral movement control is not performed when a travelling direction of another vehicle travelling in an adjacent lane is different from the direction in which the vehicle travels.

11. The vehicle control apparatus according to claim 1, wherein when a kind or color of a boundary line between the lane and an adjacent lane detected by the detector is a predetermined kind or color of the boundary line, the lateral movement control is not performed.

12. The vehicle control apparatus according to claim 1, wherein the corrected movement trajectory is generated by altering an offset amount of the offsetting depending on the size of the object with respect to the vehicle.

13. The vehicle control apparatus according to claim 1, wherein the travelling of the vehicle is controlled based on the corrected movement trajectory when a margin between an adjacent lane adjacent to the lane and the vehicle, or a margin between another vehicle which travels in the adjacent lane and the vehicle is larger than the predetermined margin threshold when the vehicle travels in the corrected movement trajectory.

14. The vehicle control apparatus according to claim 13, wherein the at least one memory further stores instructions that, when executed by the at least one processor, cause the at least one processor to determine whether or not sideward passing of the object is completed based on the information acquired by the detector, and when the sideward passing is not completed, continue travelling control of the vehicle based on the corrected movement trajectory.

15. The vehicle control apparatus according to claim 14, wherein when sideward passing of the object is completed, the at least one memory further stores instructions that, when executed by the at least one processor, cause the at least one processor to perform travelling control of the vehicle by switching the movement trajectory, which provides a reference for preceding vehicle following travelling, from the corrected movement trajectory to the movement trajectory of the preceding vehicle.

16. A vehicle comprising the vehicle control apparatus according to claim 1.

17. A vehicle control method of a vehicle control apparatus for controlling the movement of a vehicle in a lateral direction intersecting a direction in which the vehicle travels based on a movement trajectory of a preceding vehicle, comprising:
detecting a surrounding environment of the vehicle, and a preceding vehicle which travels ahead in a same lane in which the vehicle travels, and a following vehicle which travels on a diagonally rear side of the vehicle;
determining whether or not the preceding vehicle straddles lanes, or approaches within a set distance predetermined for the lanes based on lateral movement information of the preceding vehicle detected in the detecting step; and
controlling a lateral movement of the vehicle based on a determination result in the determining step and detection information in the detecting step,
acquiring a sideward distance between an object to be avoided and the side of the vehicle from information acquired by the detecting step, when a vehicle width of the vehicle is larger than a vehicle width of the preceding vehicle; and
generating a corrected movement trajectory which is offset from the movement trajectory of the preceding vehicle in a direction away from the object when the sideward distance is not more than a threshold,
wherein, in the controlling step, a lateral movement control is performed based on the movement trajectory of the preceding vehicle such that a target movement position of the vehicle in the lateral direction is adjusted in the same direction to a lateral position of the preceding vehicle which moves in a lateral direction when it is determined that the preceding vehicle does not straddle lanes or does not approach within a set distance predetermined for the lanes in the determining step, and when the object to be avoided is detected at a position in the same lane in a direction opposite to the lateral direction in which the preceding vehicle moves, and a margin between the following vehicle and the vehicle is larger than the predetermined margin threshold in the detecting step, the lateral movement is controlled based on the corrected movement trajectory in a state in which a predetermined distance to both the object and the following vehicle is ensured, when the vehicle width of the vehicle is larger than the vehicle width of the preceding vehicle, and the sideward distance is not more than the threshold, and the margin is larger than the predetermined margin threshold, and in a case which sideward passing of the object is completed based on the information acquired by the detector, the corrected movement trajectory is changed to the movement trajectory of the preceding vehicle in the controlling of the lateral movement.

18. A non-transitory computer-readable storage medium storing a program for causing a computer to execute each step of the vehicle control method according to claim 17.

* * * * *